United States Patent [19]

Hagström

[11] Patent Number: 5,903,820
[45] Date of Patent: May 11, 1999

[54] RADIO COMMUNICATIONS TRANSCEIVER WITH INTEGRATED FILTER, ANTENNA SWITCH, DIRECTIONAL COUPLER AND ACTIVE COMPONENTS

[75] Inventor: Panu Hagström, Oulu, Finland

[73] Assignee: LK-Products OY, Kempele, Finland

[21] Appl. No.: 08/627,191

[22] Filed: Apr. 3, 1996

[30] Foreign Application Priority Data

Apr. 7, 1995 [FI] Finland ................................. 951669

[51] Int. Cl.⁶ ................................................. H04B 1/46
[52] U.S. Cl. .............................. 455/82; 455/78; 455/84; 333/17.3; 333/124
[58] Field of Search ................................. 455/78, 82, 84, 455/85, 86, 87, 89, 550, 575, 307; 333/118, 124, 17.3

[56] References Cited

U.S. PATENT DOCUMENTS

| | | | |
|---|---|---|---|
| 4,907,291 | 3/1990 | Yamamoto | 455/87 |
| 4,972,455 | 11/1990 | Phillips et al. | 455/76 |
| 5,020,147 | 5/1991 | Okanobu | 455/302 |
| 5,023,935 | 6/1991 | Vancraeynest . | |
| 5,109,536 | 4/1992 | Kommrusch | 455/272 |
| 5,230,088 | 7/1993 | Kramer, Jr. et al. | 455/84 |
| 5,319,800 | 6/1994 | Erbora et al. | 455/78 |
| 5,355,524 | 10/1994 | Higgins, Jr. | 455/82 |
| 5,444,865 | 8/1995 | Heck et al. | 455/78 |
| 5,465,409 | 11/1995 | Borras et al. | 455/84 |

*Primary Examiner*—William A. Cuchlinski, Jr.
*Assistant Examiner*—G. Arthur
*Attorney, Agent, or Firm*—Darby&Darby

[57] ABSTRACT

The object of the invention is a radio communication transceiver, in which the low noise pre-amplifier and mixer of the receiver and the power amplifier, directional coupler and the mixer of the transmitter are integrated in connection with the filter section. The active components are integrated with the filter so that the entity forms one component on the circuit board of the telephone.

13 Claims, 14 Drawing Sheets

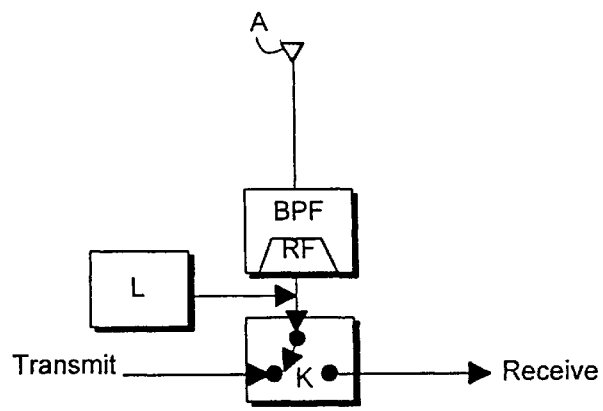
Fig. 4a
PRIOR ART
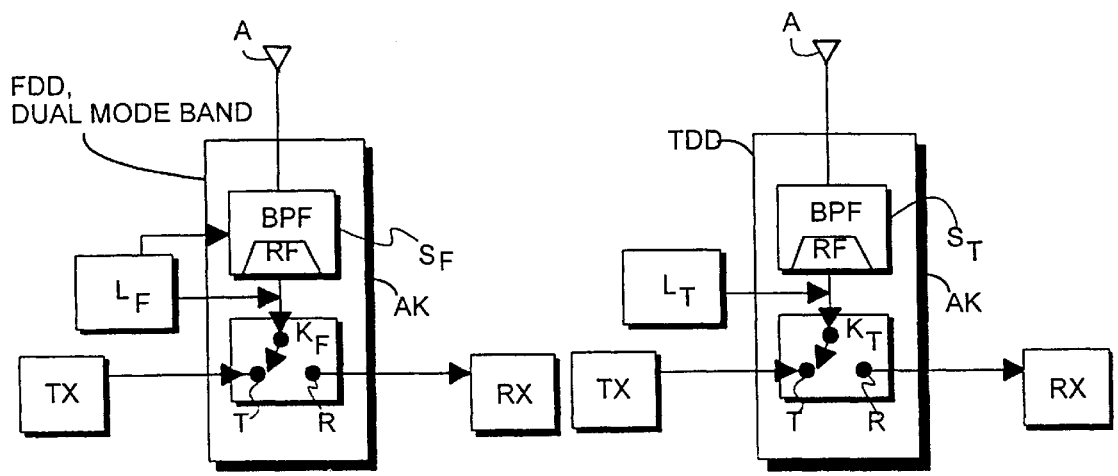
Fig. 4b
PRIOR ART
Fig. 4c
PRIOR ART
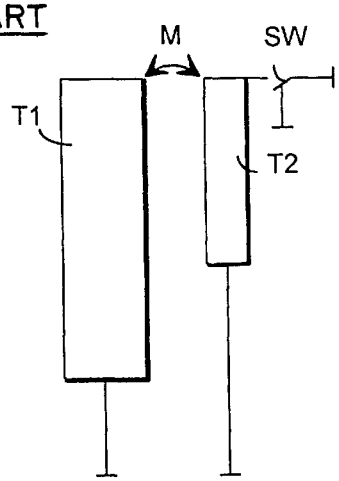
Fig. 5
PRIOR ART

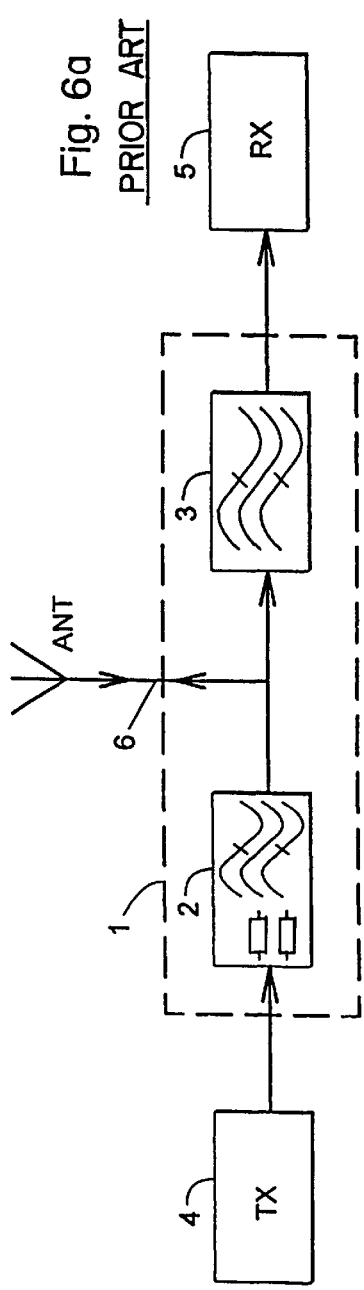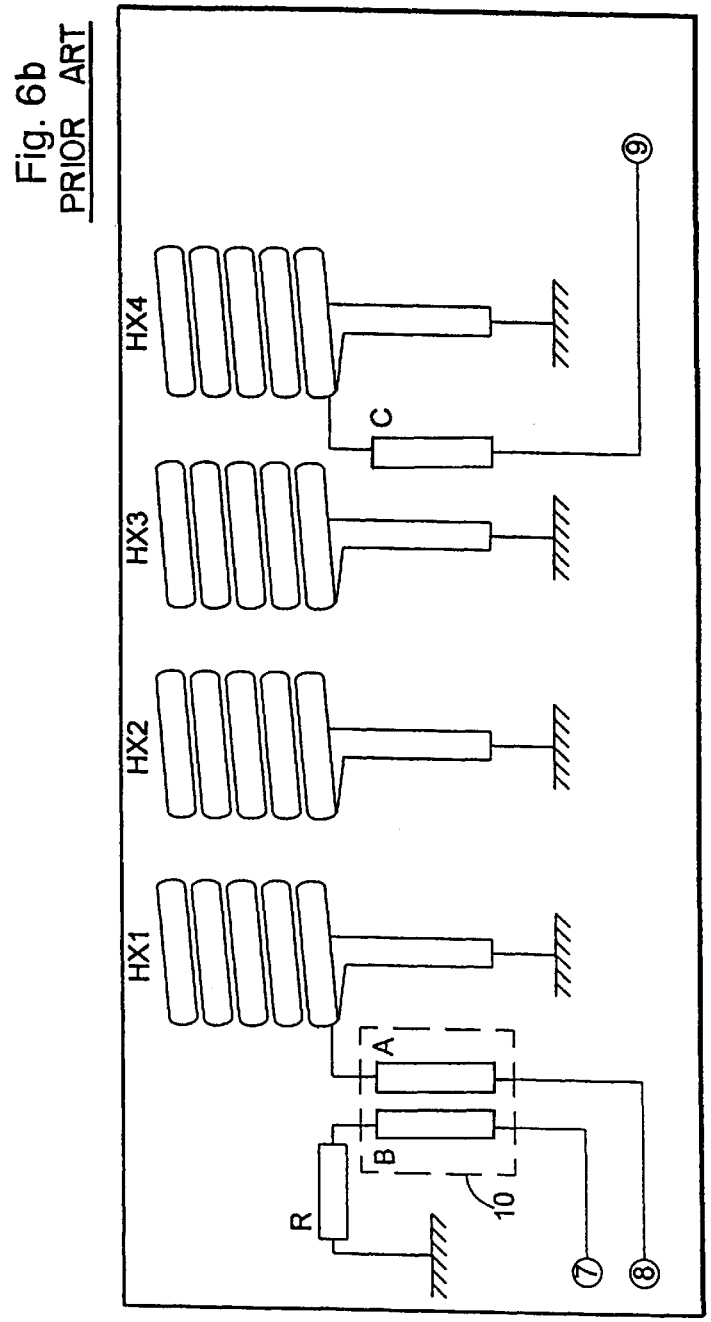

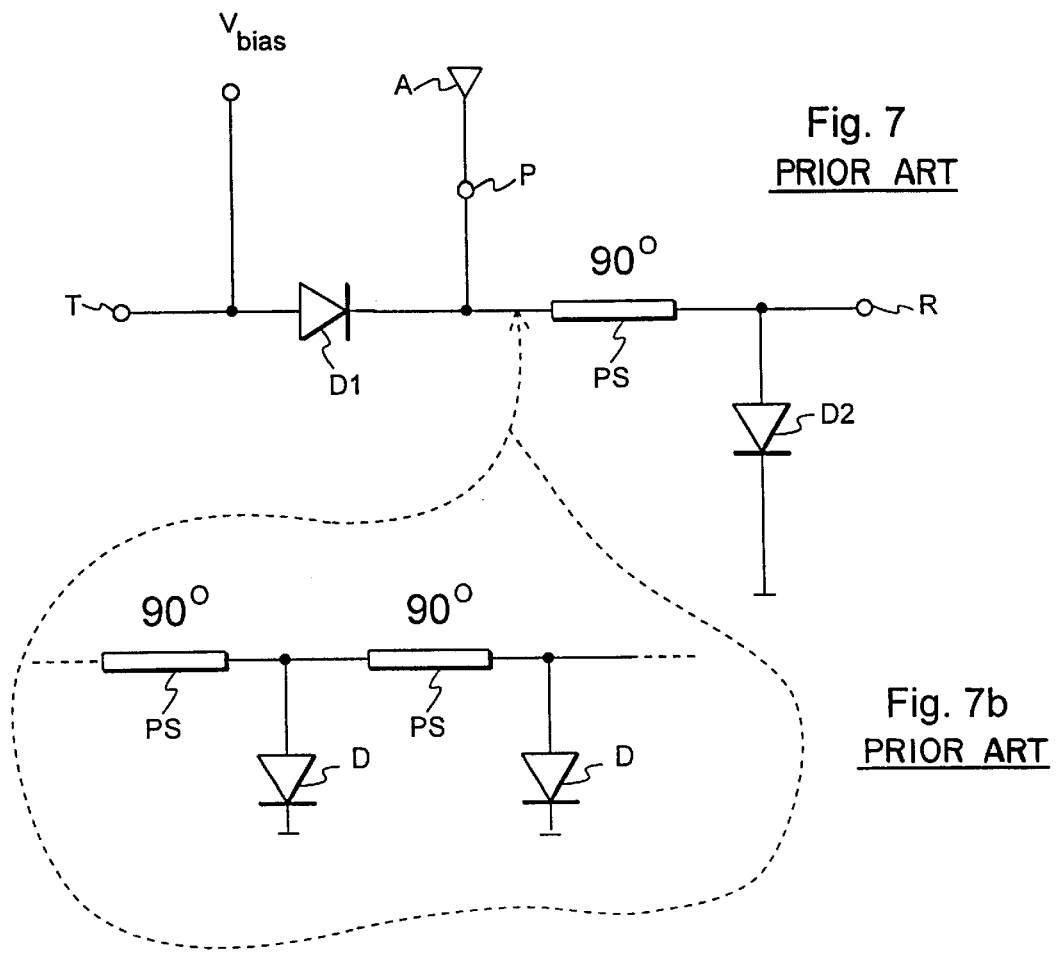
Fig. 7 PRIOR ART
Fig. 7b PRIOR ART
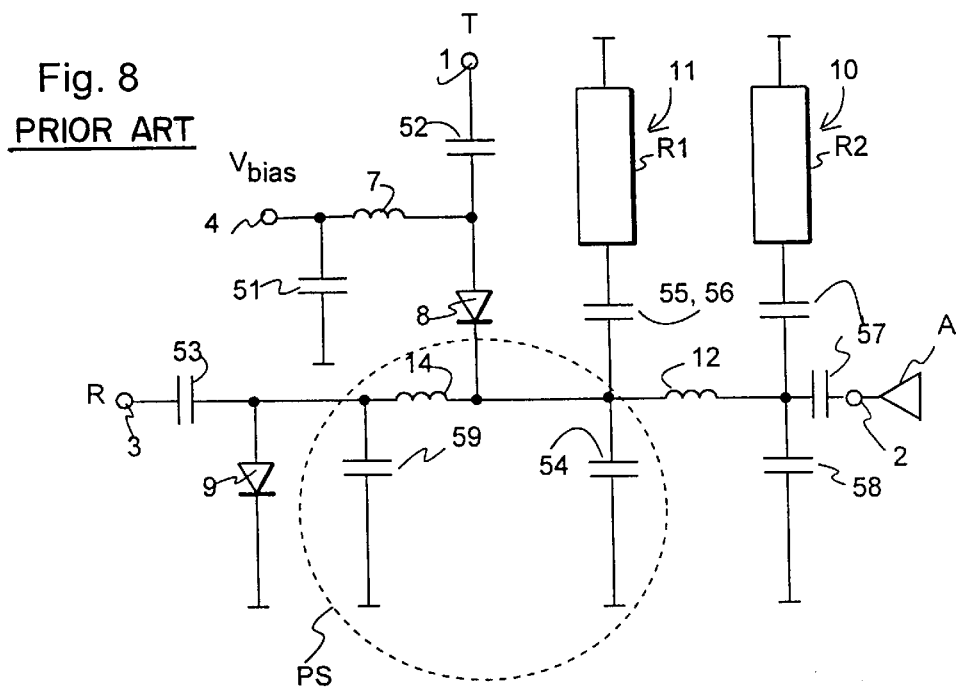
Fig. 8 PRIOR ART

RADIO COMMUNICATIONS TRANSCEIVER WITH INTEGRATED FILTER, ANTENNA SWITCH, DIRECTIONAL COUPLER AND ACTIVE COMPONENTS

FIELD OF THE INVENTION

The present invention relates to a small size radio communication transceiver structure with a high degree of integration. It comprises:

a) a combined antenna switch and filter section, in which a filter with tunable pass band characteristics is realized with resonators, and with which the transmitter and the receiver of the radio device can be connected to a common antenna in a mobile phone network based on Time Division Multiple Access (TDMA), which can use either Frequency Division Duplex (FDD) or Time Division Duplex (TDD), b) a directional coupler, c) a Power Amplifier (PA) and a mixer in the transmitter, and d) a Low Noise Amplifier (LNA) and a mixer in the receiver.

BACKGROUND OF THE INVENTION

A radio device according to prior art with duplex function and utilizing time or frequency division duplex (FDD, Frequency Division Duplex: TDD. Time Division Duplex) comprises several RF and IF filters both on the transmitter and the receiver side. FIG. 1 shows a TDM radio according to prior art. The radio device 10 comprises on the receiver side a band-pass filter 12 with its input port connected to the antenna switch 14. The output port of the filter is connected to a low noise amplifier (LNA) 17, which amplifies the received radio signal. After this there is a second band-pass filter 18, which further filters the received signal. The output port of the filter 18 is connected to a mixer 11, in which the received signal is mixed with the first injection signal from the synthesizer 22. The intermediate frequency (IF) signal obtained as the mixing result is then supplied to the RF circuit for further processing.

The transmitter section of the radio 10 comprises a second local oscillator (LO) signal 26, which is generated by the transmitter front end (not shown) and mixed in a mixer 30 with the first injection signal. The output of the mixer 30 is supplied to the band-pass filter 13 )which is located before the power amplifier 14 of the transmitter. The output of the power amplifier 14 is connected to the input to a low-pass or band-pass filter 15, so that undesired components can be filtered from the transmitted signal before it is broadcast via the antenna. Between the power amplifier 14 and the band-pass filter 15 there is often a directional coupler (not shown) with which it is possible to measure the power level of the signal going to the antenna.

It is very difficult to integrate two successive RF blocks (e.g. LNA 17 and the antenna switch 14) and the "off-chip" filter 12 between them. The filter may be for instance a helical, a dielectric or another corresponding filter, and regarding the function of the shown radio design 10 it is necessary to use this filter. The difficulty is primarily due to the fact that if the "off-chip" filter and the RF blocks are integrated on the same chip, then the large size of the filter requires large size connection strips—compared to the RF blocks realized in IC technology, whereby the selectivity of the filter is impaired by the electrical stray quantities and inductive coupling caused by these strips. In practice a complete integration will not be economical when "off-chip" filters are used between the RF blocks. Thus TDNI radios according to prior art comprise several RF blocks realized with concentrated or discrete components, and filters connected between the blocks.

50 $\Omega$ was established as a standard impedance in the interfaces between the discrete components and the filters. Manufacturers of filters and semiconductors adapt their input and output impedances to the standard value in order to facilitate a modular design. Very often the input and output impedances of RF circuits would preferably be lower, for instance an optimal input impedance level of the LNA 17 would be about 10 $\Omega$. The adaptation to the standard value must be made with a matching circuit, which is made of discrete components or which the semiconductor manufacturer integrates as a part of the RF circuit. In order to be able to substantially decrease the size and price of the radio device from the present level we must develop a radio architecture which enables an easier integration of said blocks.

It is known to integrate all active components of a radio transceiver on one chip. The patent publication WO 93/14573 shows a new architecture solution based on time division multiple access and using time duplex. In the architecture presented in the publication all active components of the transceiver were integrated in one circuit, whereby it was possible to increase the degree of the integration. However, the filters essential for the function of the structure are left outside the integrated circuit, so that there are substantial problems in the matching of these circuits.

The major disadvantage of the design presented in the publication is that without a separate duplexer it can not be used in systems using Time Division Multiple Access and Frequency Division Duplex (TDMA/FDD). which in practice almost doubles the physical size of the circuit shown in the publication. Also, the design does not contain any directional coupler or a direct measuring connection for automatic gain control. The directional coupler must be realized as a transmission line outside the integrated circuit, directly on the printed board of the telephone, which is very susceptible to electrical interference. A directional coupler made on the printed board requires a substantial area on the printed board and also causes an extra attenuation of at least 0.5 dB in the transmitter chain which has a direct effect on the power consumption of the telephone and thereby on the achievable talk time.

Another disadvantage of the design presented in the above publication is the poor selectivity of the transmission line resonator filter formed in the ceramic surface. The filter is used to filter the mixing results of the mixer in the transmission branch. Its pass-band attenuation level is low enough, but when low intermediate frequencies of the magnitude 70 MHz are used, then the selectivity is not at all sufficient if we require e.g. 30 dB attenuation level for the mixing results.

Further we know in the prior art a transceiver, in which the duplexer, the transmitter and the receiver are integrated on one chip. This solution is presented in the patent U.S. Pat. No. 4,792,939. In the design according to the patent the duplexer is realized with Surface Acoustic Wave (SAW) filters. This design integrates the receiver's low noise amplifier (LNA), the band-pass filter realized with the SAW technology, and the mixer. The patent further presents a solution in which circuits required by the power control are integrated in said design, i.e. the directional coupler and the control unit, the power amplifier of the transmitter, and the separate amplifier for its control.

The problems of the solution presented in the patent relate to the SAW filters used. The require matching circuits that are large compared to the filters, which make it impossible to apply the solution in mobile phones, and the matching circuits realized as transmission lines on the printed boards are susceptible to electromagnetic interference. The modest power capacity of the SAW filters prevents a duplexer assembled comprising these filters to be used in the transmitter branch of a mobile phone, where the power capacitor may be 2 W. A SAW filter is also very susceptible to temperature changes, which will appear as a frequency drift. This must be observed so that the SAW filter pass-band is made wider then needed, which for its part also prevents the use of these solutions particularly in future mobile phone networks, where the transition band between the transmit and receive bands is made narrower than the present one; for instance in the future E-GSM network, which is a GSM system enhancement according to the ETSI (European Telecommunications Standards Institute) specification 05.05 "European digital cellular telecommunication system (phase 2); Radio transmission and reception", the transition band is only 10 MHz. There should also be mentioned the high passband attenuation of the SAW filters, about 3.0 to 4.0 dB, which is quite too high regarding the transmitter branch of a mobile phone.

Time division multiplex/multiple access (TDM/TDMA) is generally used in digital data communications networks, where the transmission and reception is made in different time slots. If the transmission and reception frequencies are the same, a mobile phone uses an antenna switch to separate the signals, whereby the switch connects the antenna alternately to the transmitter and the receiver branches of the device. As the isolating unit we can use a filter like the duplex filter used in analog telephones, if the transmission and the reception are made on different frequency bands. The latter alternative will come into question also in systems using frequency division multiplex/multiple access (FDM/FDMA).

A digital radiotelephone using Frequency Division Duplex (FDD) requires also filters besides the above mentioned RF switch, because the input of the receiver must have some selectivity and it must protect the low noise pre-amplifier. At the transmitter output harmonic multiples of the transmission frequency and other spurious transmissions such as minor frequencies must be attenuated. The filters further remove noise generated on the receiver's band by the transmitter chain. The frequencies below the transmission band must also be attenuated with a separate filter. In a system using time duplex, such as the DECT (Digital European Cordless Telephone), separate arrangements must further take care of sufficient attenuation of the spurious transmissions generated during signal transmission towards the antenna.

In the prior art we know solutions where the antenna switch and the filter have been combined in the same structure. The U.S. Pat. No. 5,023,935 uses as a filter two parallel transmission lines, of which the first has one end connected to the antenna. The second transmission line has the first end connected to the receiver and this end can be shorted with a PIN diode. The second end is connected to the transmitter through a reverse biased PIN diode. The use of the diodes and the transmission line provides a sufficient isolation, and some degree of filtering is obtained by using transmission lines with a mutual electromagnetic coupling. However, with this design it is not possible to use high powers, and it has very modest filtering characteristics. A further disadvantage of the design is its large size. It utilizes transmission lines with a length of a quarter-wave, having a length of about 8.5 cm at a frequency of 880 MHz. When other circuit elements are added, the total size of the design could easily amount to about 20×100 mm, which is far too much in mobile phones.

The patent Fl 90926 presents a method with which the frequency of a filter realized by transmission line resonators can be changed in a desired way and with high accuracy in a time division multiple access system, both when it utilizes one frequency band and two frequency bands. According to the patent the resonators are arranged in groups between the three ports of the filter, and with the aid of an external control signal the characteristic frequency of the resonators between e.g. the first and the third port or between the first and the second port. The resonance frequency of separate resonators is changed for instance with a method presented in the patent Fl 88442 (U.S. Pat. No. 5,298,873), in which an auxiliary resonator arranged adjacent the main resonator is shorted at one end when required, whereby the characteristic impedance of the design will change leading to a change in the resonance frequency. In the present invention it is also possible to use other known methods to shift the frequency of a resonator and a filter comprising such resonators.

The patent FI 90478 shows how transmission lines in the couplings or matching circuits of the transmitter branch can be used as a pale of a directional coupler. In this way the directional coupler can be moved from the circuit board, which is susceptible to interference and losses, inside the cover of the high frequency filter on a substrate with low loss. Measurements have shown that when we move the directional coupler to be part of the filter we obtain, due to the lower insertion loss, a power saving of about 0.3 dB compared to a conventional circuit board embodiment.

SUMMARY OF THE INVENTION

The object of the present invention is to create a combined radio transmitter/receiver design, which is applicable in a digital mobile phone system based on Time Division Multiple Access/Frequency Division Multiple Access Frequency Division Duplex/Time Division Duplex/TDMA/FDMA, FDD/TDD), and which on one hand eliminates and/or reduces the above presented disadvantages of antenna switches based on RF switches or duplex filters, and which on the other hand combines the advantages of the above designs. The object of the invention is further to increase the integration degree of a mobile phone by combining with the antenna switch and filter structure the receiver's low noise pre-amplifier and mixer, and the transmitter's power amplifier, directional coupler and mixer.

The object of the invention is attained by integrating the antenna switch, filter, directional coupler, the receiver's LNA and mixer and the transmitter's PA and mixer within the same entity, in which all parts are assembled on one low loss substrate, and where they are located within a common cover protecting against interference. This entity forms one component on the circuit board of the mobile phone.

Essential in the invention is that active components, which are the receiver's LNA and mixer and the transmitter's power amplifier and mixer, are combined to be a part of the filter structure on the same substrate together with the other components of the filter structure.

The radio transceiver according to the invention is characterized in that a switch means is arranged in the connection of its filter section, the switch operating as the antenna switch of the radio transceiver, and that said filter section, the receiver section of the device, and the transmitter section of the device, form a structural entity, in which said receiver section and said transmitter section are arranged in connection with the switch means and the filter section so that the supporting structure of the transmitter and receiver sections is the same as the supporting structure of the combined antenna switch and filter section, the galvanic connections between the parts belonging to the arrangement are realized using said common supporting structure, and that the transmitter and receiver sections are located within the protective cover, belonging to the filter section and made of electrically conducting material.

The active components can be realized as discrete components, as one GaAs circuit, or as a multichip module, which is known per se and belongs to prior art. The inventive idea of the present invention is to integrate the active component realized in said way within the filter-antenna switch-directional coupler-structure, whereby the major part of matching circuits can be eliminated, which matching circuits would match the interfaces of discrete components to the standard value 50 Ω.

This means in the first place the matching, circuits required so far at the input of the receiver's low noise pre-amplifier and at the output of the transmitter's power amplifier. Further all passive components required in the structure can be integrated, e.g. in thick film or thin film technology directly on the circuit board by using the MCM (Multichip Module) technology. Thus we can eliminate discrete modules and the reliability of the whole structure increases, its total weight and size decreases. Further we achieve cost savings in the manufacturing. Rewarding the electrical functions it is essential that parasitic elements are eliminated, which results in electrical circuits operating faster and with a lower total power consumption.

The invention and its embodiments are now described in more detail with reference to the enclosed drawings, in which FIG. 1 shows as a block diagram a TDM radio according to prior art;

FIG. 4a shows as a block diagram the use of an RF switch and filter in separate sections;

FIG. 4b shows as a block diagram the front-end of a device using the RF switch/filter structure;

FIG. 4c shows as a block diagram the front-end of a device using another RF switch/filter structure;

FIG. 5 shows as a simplified circuit diagram a known method with which the frequency of a resonator can be changed;

FIGS. 6a and 6b show in a simplified way a known method with which a directional coupler can be realized in connection with a filter;

FIG. 7 shows as a simplified circuit diagram a known antenna switch design;

FIG. 7b shows a principle with which the isolation of the antenna switch according to FIG. 7 can be increased;

FIG. 8 shows as a simplified circuit diagram how the known antenna switch design of FIG. 7 can be integrated as a pair of the filter structure;

DETAILED DESCRIPTION OF THE PREFERRED EMBODIMENT

Figure 1:
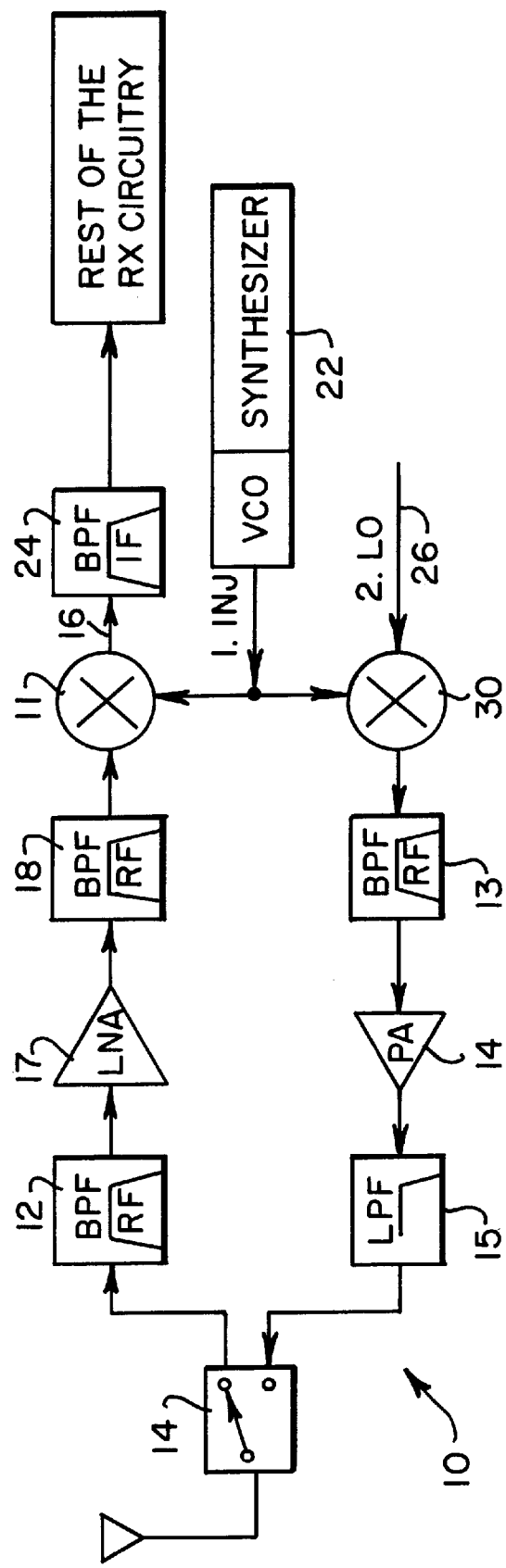

First we describe in more detail the prior art with reference to FIGS. 4b to 13.

FIGS. 4b and 4c show an RF switch $K_T$, $K_F$ and filter $S_T$, $S_F$ which are integrated as an antenna switch block AK. When a signal is transmitted in a TDMA/FDD system (FIG. 4b), the control logic $L_F$ directs the signal through the filter $S_F$ with the RF switch $K_F$ in position T. Then the center frequency of the filter $S_F$ corresponds to the transmission frequency of the system. Then the RF switch appears to the transmitted signal as a low impedance signal path to the transmitting port. When the switch is in the position T, the filter $S_F$ appears towards the antenna A as having an impedance equal to that of the antenna, i.e. as matched to the antenna. When a signal is transmitted in a TDMA/TDD system (FIG. 4c). the control logic $L_T$ controls the RF switch into position T and connects the signal through a fixed frequency filter $S_T$ and the RF switch $K_T$ to the antenna. When the signal is transmitted the RF switch $K_T$, $K_F$ appears to the receiving port as a very high impedance and attenuates the signal in the solutions according to both FIG. 4b and FIG. 4c. In the transmission the attenuation of the RF switch $K_T$, $K_F$ can vary from 10 to 70 dB, depending on the switch type in use and on the configuration.

When the signal is received with the solution according to FIG. 4c in a TDMA/TDD system, the control logic $L_T$ controls the signal through the filter $S_T$ to the RF switch $K_T$, which is then in position R. When the signal is received with the solution according to FIG. 4b in the time division system, the control logic $L_F$ changes the center frequency of the resonators of the filter $S_F$ so that it corresponds to the reception frequency by changing the resonator frequency, e.g. with the method presented in the patent FI-88442. To a person skilled in the art it is obvious that it is possible to change the resonator frequency also with other known methods so that it changes from the transmission frequency to the reception frequency of the system. In the time division system the control logic $L_F$ controls the RF switch $K_F$ into position R and connects the signal through the filter $S_F$ and the RF switch $K_F$ to the reception port RX. When the signal is received the RF switch $K_T$, $K_F$ appears to the received signal as a signal path with low impedance and low reflection to the reception port RX in the solution according to the solutions of both FIG. 4b and FIG. 4c. When the signal is received the RF switch $K_T$. $K_F$ appears to the transmission port as a very high impedance which attenuates the signal. The attenuation of the RF switch $K_T$, $K_F$ can in reception vary from 10 to 30 dB depending on the switch type in use and on the configuration. The design of FIG. 4a formed by discrete blocks has compared to the solutions of FIGS. 4b and 4c the above mentioned disadvantages of the discrete component embodiments.

In FIG. 5 the reference numeral T1 shows a main resonator, which can be of any type, such as a helical, a coaxial, a dielectric or a stripline resonator. This resonator has a certain resonance frequency f. A stripline T2 is located in its electromagnetic field, whereby the stripline has an open top end which can be shorted with the switch S. A coupling M acts between the resonators. When the switch is open the stripline functions as a half-wave resonator ($\lambda/2$-resonator), which has a certain resonance frequency $f_0$. Due to the measurements of the stripline this resonance frequency $f_0$ is so far from the resonance frequency f of the main resonator T1 that the auxiliary resonator T2 hardly has any effect on the center frequency f of the main resonator T1. When the switch S is closed it shorts one end of the stripline, so that it changes into a quarter-wave resonator ($\lambda/4$-resonator), which has the resonance frequency $f_0/2$, which is thus higher than f. The coupling M will now cause the resonance frequency of the main resonator T1 to shift downwards by the amount $\Delta f$. The amount of this shift $\Delta f$ can be made as desired by selecting a suitable resonance frequency $f_0$ and coupling M. The coupling M is determined by the dimensions and the mutual location of the resonators.

FIG. 6 shows the interface between the radiotelephone's duplex filter and other blocks of the telephone. The duplex filter/directional coupler block 1 comprises four ports: one port 8 for the transmission signal coming to the filter, one antenna port, the receiver port, and the directional coupler port 7. The received signal coming from the antenna 6 propagates to the receiver 5 through the reception filter block 3 of the duplex filter 1. Correspondingly, the signal coming from the transmitter 4 propagates to the antenna 6 through the RX isolation filter block 2 of the duplex filter 1. From this signal propagating to the antenna the directional coupler 10 takes a sample with a certain level, corresponding to the power level of the transmitter, and connects it to the directional coupler port.

FIGS. 6a and 6b are an example of an embodiment in which the RX isolation filter 2 of the duplex filter 1 is realized by the helical resonator technology and the directional coupler 10 is integrated in the matching circuit at the resonator's transmitter end Preferably the directional coupler is realized by using parallel microstriplines. The first stripline A functions as a coupling strip between the filter input and the helix HX1, and the second stripline B functions as a coupling strip to the directional coupler port 7. The coupling strip B is terminated with a resistor R. In the filter according to the figure the directional coupler could also be located in front of the antenna port 9, whereby it could easily be realized by adding in parallel with the impedance matching stripline C a circuit, which would comprise a directional coupler stage 7, a stripline B with electromagnetic coupling to the stripline C, and a terminating resistor R.

FIG. 7 shows a well known RF switch design realized with PIN diodes. The RF switch design according to the FIG. 7 can be integrated in the filter. Other RF switches could also be used. When a signal is transmitted both PIN diodes D1 and D2 of the RF switch are forward biased by the biasing voltage $V_{bias}$. Then the series connected PIN diode D1 appears to the signal going to the antenna A as a low impedance signal path, and the parallel connected PIN diode D2 effectively shorts the antenna port as seen from the reception port R, thus preventing its overloading and protecting the sensitive low noise pre-amplifier (LNA in FIG. 1) against the strong transmitter signal. In the transmission mode the antenna and reception port R can be isolated by changing the low impedance of the parallel connected PIN diode D2 to a high value by the 90 degrees phase shifter PS. It is to be noted that LC low-pass structures are generally used as the coupling elements of the stop-band filter realized e.g. by transmission line resonators whereby these structures can be utilized as part of the RF switch in the form of the phase shifter PS. The LC low-pass structures also form a low-pass filter to filter the harmonics generated by the transmitter. The required isolation can be increased for each application e.g. by increasing the number of PIN diodes connected in parallel with the reception branch of the RF switch so that they are mutually connected at quarter-wave distances according to FIG. 7b.

When a signal is received both PIN diodes D1 and D2 are reverse biased and appear to the received signal as a low capacitance, which creates a low impedance and low loss signal path from the antenna A to the reception port R. During, signal reception the transmission port T is isolated from the antenna port A due to the high impedance caused by the zero or reverse bias of the PIN diode D1 connected in series with the transmission branch of the RF switch. The presented design does not in any way limit the design of the RF switches which can be used in the invention but the RF switch can be for instance a PIN diode switch of the serial-serial, parallel-parallel type well known to a person skilled in the art and which can be controlled by one ore more biasing voltages. Further the embodiment of the RF switch is not limited only to switches realized with PIN diodes, but it can be realized e.g. in GaAs technology. The RF switch can be integrated on the same substrate as a SAW filter, so that their common structure form a very small and compact component when it is packaged and possible hermetically sealed.

FIG. 8 shows an antenna switch according to FIG. 7 integrated in the filter. In signal transmission and reception the band-stop structure formed by the resonators R1 and R2 has the same functions as the transmission filter 15 and reception filter 12 according to FIG. 1, when their frequencies are changed so that they satisfy the space required by each. The antenna switch formed by the PIN diodes and the striplines and discrete components of the filter correspondingly has the same functions as the antenna switch according to FIG. 7.

When a signal is transmitted the control logic $L_T$, $L_F$ (shown in FIGS. 4b and 4c) directs a positive voltage to port 4, so that both PIN diodes 8, 9 also are forward biased. Then the signal passes from the transmission port 1 to the antenna through the pass band filter formed by the resonators 10 (R2), 11 (R1) and capacitors 54 to 58 and coil 12. The signal does not go to the reception port 3, because the low forward resistance of the second PIN diode is transformed into a high resistance (the signal is attenuated about 30 dB) with the aid of the 90° phase shifter PS formed by the transmission lines (shown in the embodiment example FIGS. 7 and 8), the capacitors 54, 59 and the coil 14.

When the signal is received the control logic directs a zero bias to the port 4. Then both diodes 8, 9 are reverse biased. Then the signal passes from the antenna A through the pass-band filter to the reception port 3, because due to the PIN diode 8 the impedance of the transmission port appears as a very high impedance to the signal.

Figure 3:
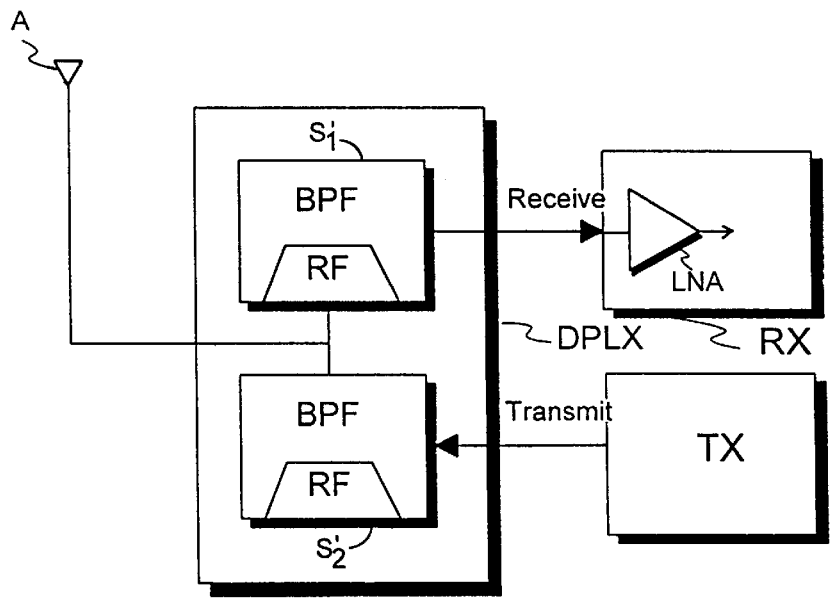
FIG. 3 shows the use of a duplex filter in a radiotelephone.

The number of extra components required by the antenna switch can be minimized with the presented arrangement, because the transmission lines and capacitors already present in the filter itself can be utilized for the realization of the phase shifter PS and the required transmission lines. The extra components required by the antenna switch are the bias port 4, the current limiting resistor 6 (shown in FIG. 15 and 16), the inductor 7, the PIN diodes 8 and 9, and the capacitors 51 to 53. Instead, the filter already contains the phase shifter PS which is formed by the capacitors 54, 59 and the coil 14, and which is required in the antenna switch, so that the arrangement provides a reduction in the number of components compared to a situation when the design would be realized with a separate filter and antenna switch according to FIG. 3a. The other components belonging to the filter are the resonators 10, 11 and the capacitors 54 to 58 and the coil 12.

Filters of different types and based on different resonators can be used as the filter. In the case of high power and high frequency it is preferable to use a filter based on helical resonators or ceramic transmission line resonators. Also e.g. a surface acoustic wave (SAW) filter or a stripline filter can come into question so that the resonators 10 and 11 are made as transmission line resonators e.g. instead of the SAW filter 15 in FIG. 10, or instead of the dielectric resonators in FIG. 9. To a person skilled in the art it is clear that also filters of other types could be used. Previously we mentioned that the isolation attenuation between the transmitter and the receiver is of the magnitude 30 dB. Correspondingly the isolation attenuation requirement is typically 60 dB in analog telephones. When we also observe the isolation, e.g. 20 dB which is achievable even with a simple RF switch, the filters in the TDMA/FDD and TDMA/FDMA systems can use less resonators, whereby the size of the filter decreases. We could for instance estimate that when we use ceramic resonators in the filter the volume of the whole antenna switch A would be considerably less than one cubic centimeter.

Figure 9A:
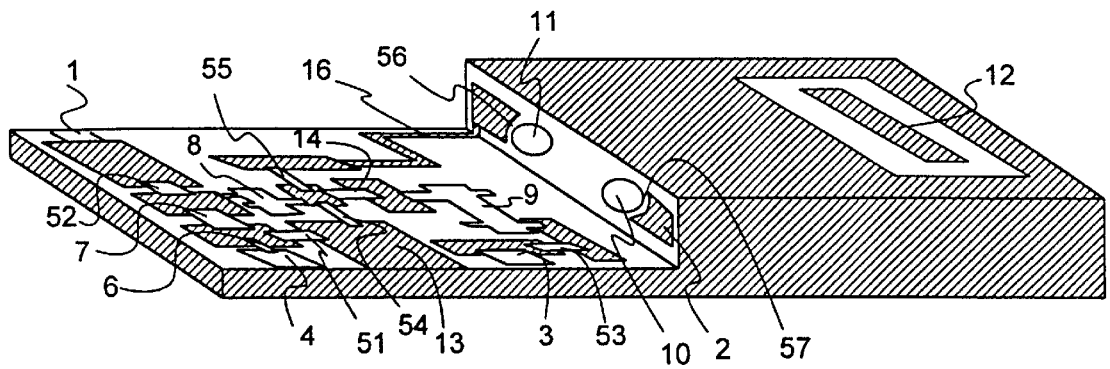
FIG. 9a shows how the structure according to the circuit diagram of FIG. 8 is realized by using a filter.

FIG. 9 shows a dielectric filter as a basic embodiment of the circuit diagram according to FIG. 8, this filter comprising a block of dielectric material in which the resonators are formed as bores, which extend through the block and which are coated with a conducting material. The circuit arrangement in FIG. 9a is not quite identical with that of FIG. 8, but it shows the main features of the embodiment. The dielectric block is generally coated with a conducting material except for that surface of the block where the so called high impedance ends of the resonators opens. In the figure this surface is shown as a surface having the resonator holes 10, 11. The bottom end of the resonators, where the coating of the bores joins the coating of the block, is not shown in the figure. In FIG. 9a all other components of the figure except the resonators are formed by transmission lines (the ruled segments) and by discrete components (e.g. surface mount components), which in the figure are shown as light segments. The connecting tab 13 joins the block coating, i.e. it functions as a ground plane. The coil 12 is formed on the lateral surface of the block. Also other coupling patterns and components could as well be made on the lateral surface of the ceramic block.

Figure 9B:
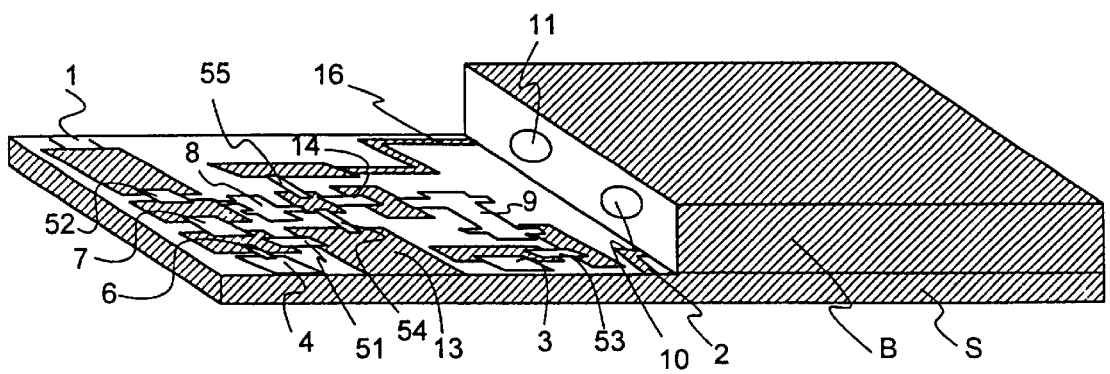
FIG. 9b shows another way to realize the structure according to the circuit diagram of FIG. 8 by using a dielectric filter.
Figure 9C:
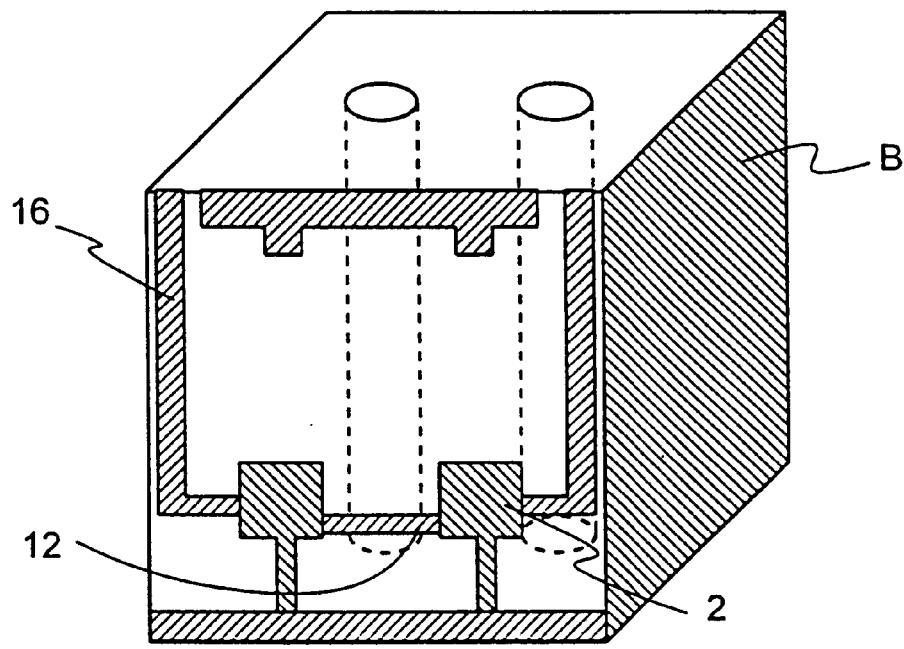
FIG. 9c shows the bottom surface of the resonator block of FIG. 9b.

The embodiment shown in FIGS. 9b and 9c, in which the coupling to the resonators 10, 11 is made at the lateral surface of the resonator block B. Other coupling patterns are arranged on a separate substrate S, which can be a ceramic or a Teflon substrate, or a circuit board of some other material. In the embodiment according to the FIGS. 9b and 9c the lateral surface containing the coupling patterns is also substantially without coating, in addition to the top surface of the resonator block B. The coupling patterns, which are used for the coupling to the resonators 10, 11, are located between the resonator block B and the substrate S, and therefore they are not seen in FIG. 9b. These coupling patterns are shown in more detail in FIG. 9c, which shows the resonator block B seen from that lateral surface, which in FIG. 9b is against the substrate S. The dimensions in FIG. 9c do not correspond to the dimensions of the blocks in FIG. 9b. The stripline 16 on the substrate joins the stripline 16 on the lateral surface of block B shown in FIG. 9c, and is so electromagnetically coupled to the resonator 11. The coupling from the resonator 10 to the antenna is made through the coupling tab 2, from which the signal is directed along the stripline to the substrate S and on the substrate to the stripline 2, shown in FIG. 9b.

Figure 10:
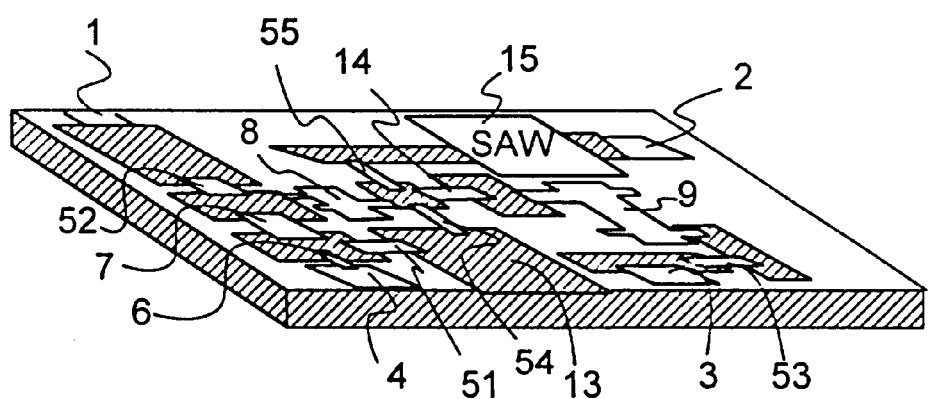
FIG. 10 shows how the structure according to the circuit diagram of FIG. 8 is realized by using a SAW filter.

FIG. 10 shows an embodiment corresponding to that of FIGS. 9a and 9b, but here a Surface Acoustic Wave (SAW) filter is used as the filter. The SAW filter 15 can be embedded in the same substrate, on which other components and coupling patterns are situated, as is presented e.g. in the publication U.S. Pat. No. 5,254,962.

Figure 11:
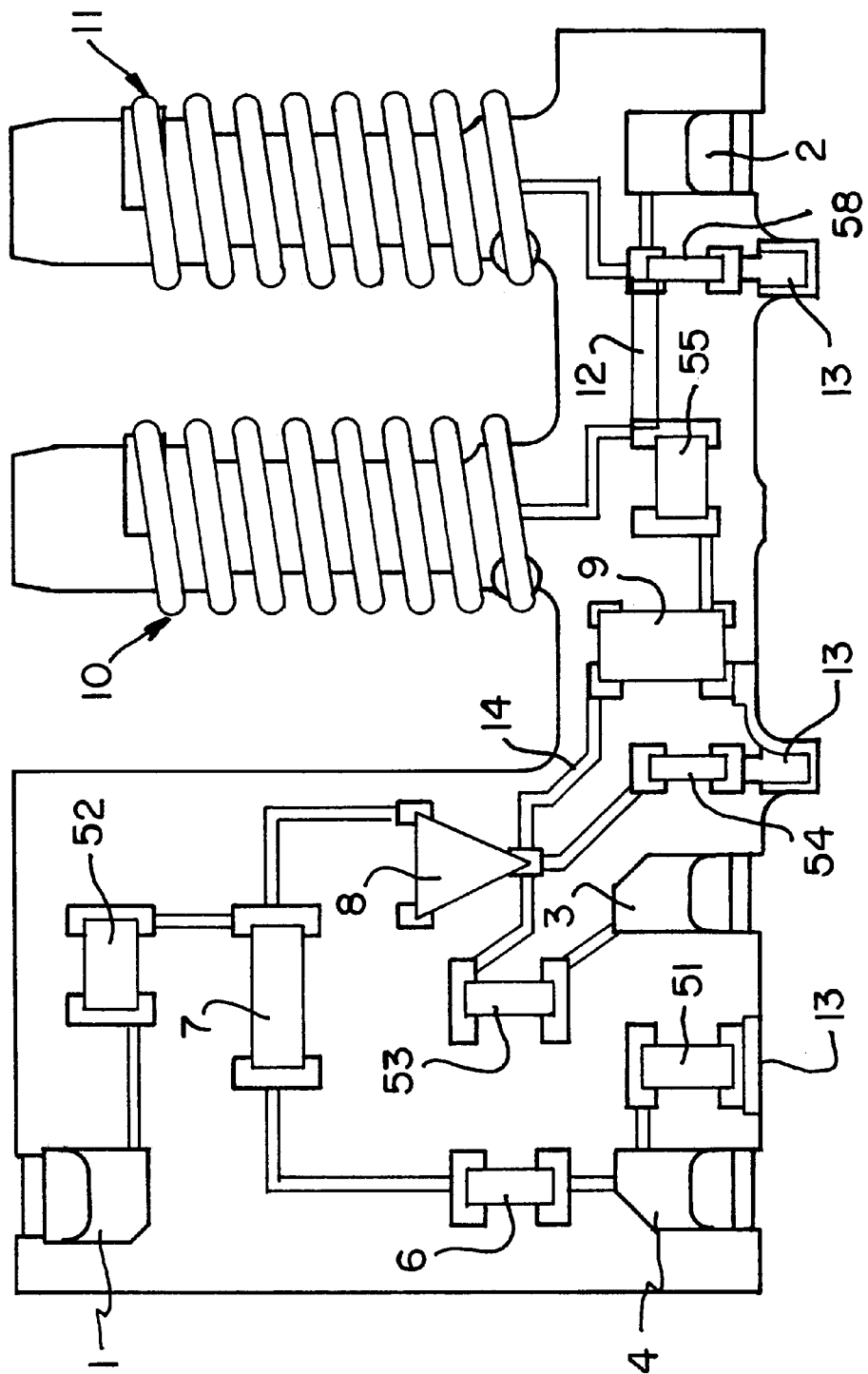
FIG. 11 shows how the structure according to the circuit diagram of FIG. 8 is realized by using a helical resonator filter.

FIG. 11 shows an embodiment of the circuit according to the FIG. 8 in a helical resonator filter. The helical resonators of the filter can be realized as a so called finger support structure (or comb structure). which is described e.g. in the Finnish patent FI-80542. Then the resonators 10, 11 are formed by a metal wire wound as a cylindrical coil around an extension of the dielectric board. On the lower part of the board an electrical circuit is formed by discrete components, e.g. surface mount components, and striplines. The strips and components required for the antenna switch can easily be added to the dielectric board, whereby a compact combined structure of the antenna switch and the filter according to the invention is obtained. Several components 6 to 9, 12, 51 to 58 are shown in the figure as surface mount components which are soldered to the connecting tabs.

Figure 12:
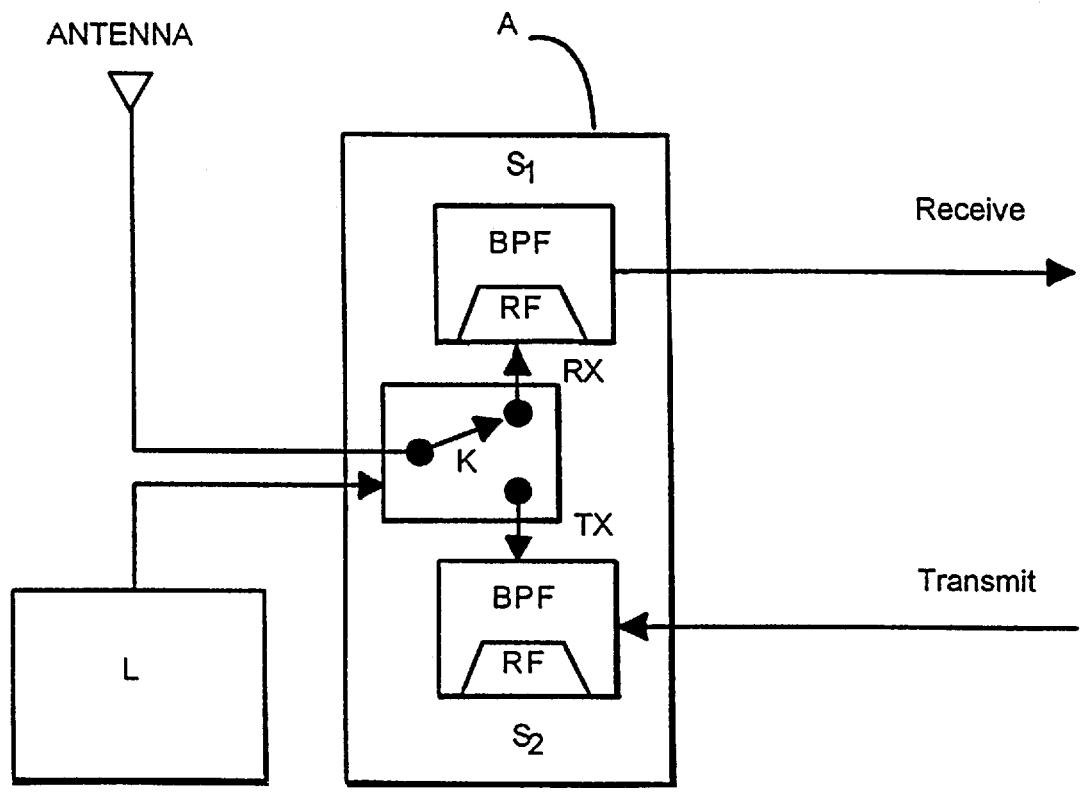
FIG. 12 shows as a block diagram the front-end of a device using an RF switch/filtering antenna switch.

FIG. 12 shows another embodiment, in which the RF switch K and the filters S1 and S2 are integrated into the same antenna switch block A. When a signal is transmitted the control logic L drives the RF switch into the position TX. Then the RF switch appears to the transmitted signal as a low impedance signal path from the TX port to the antenna port, and the transmission filter S1 is seen by the antenna as an impedance having the antenna impedance or matched to the antenna. The reception filter S2 is seen by the antenna as a very high impedance which attenuates the signal so much that it will not reach the receiver. The RF switch is further seen by the RX port as a very high impedance. The attenuation of the RF switch can vary according to the switch type and the configuration between 10 and 50 dB.

When a signal is received the control logic drives the RF switch into the position RX. Then the RF switch K appears to the received signal as a low impedance an low reflection signal path to the RX port. The reception filter S2 is seen by the antenna as an impedance having the antenna impedance or matched to the antenna. The transmission filter is seen at the reception band as a high impedance which attenuates the signal. The switch is also seen by the TX port as a very high impedance.

Figure 2:
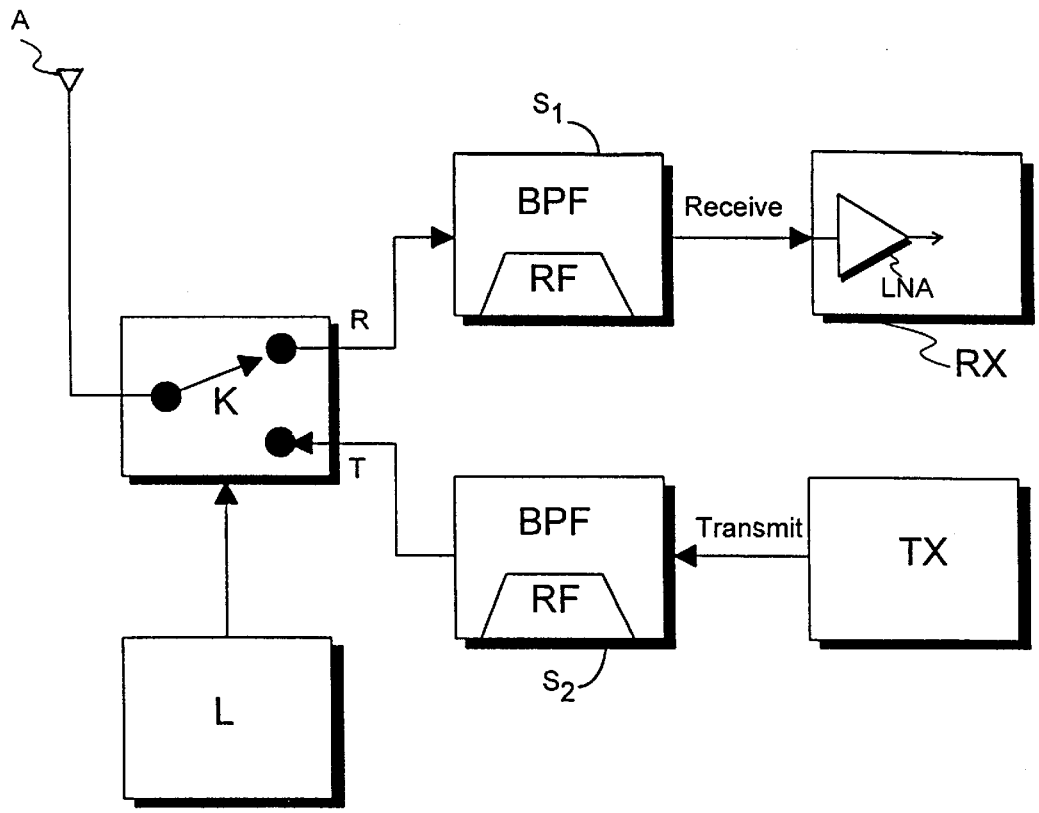
FIG. 2 shows as a block diagram a prior art RF antenna switch and interface to the radiotelephone.
Figure 13:
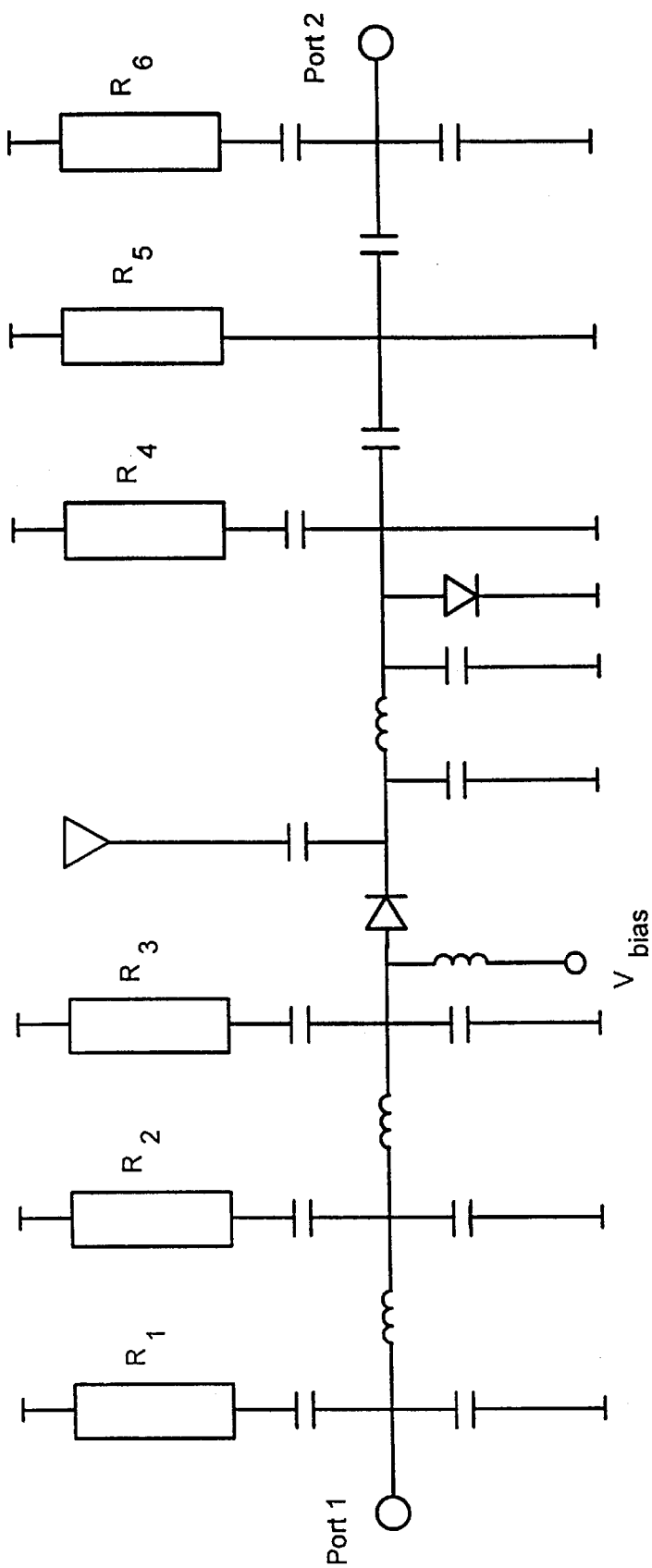
FIG. 13 shows as a simplified circuit diagram how the known antenna switch design according to FIG. 7 can be integrated as a pair of the duplex filter.

FIG. 13 shows how the embodiment of the block diagram of FIG. 12 is realized as a circuit diagram. The stop-band filter structure formed by the resonators R1 to R3 have the same functions as the transmission filter S2 according to the FIG. 2. Correspondingly the pass-band filter structure formed by the resonators R4 to R6 has the same functions as the reception filter S1. The antenna switch, which is formed by PIN diodes, transmission lines of the duplex filter and discrete components, has the same functions as the antenna switch according to the FIG. 7.

Below we describe the invention and its embodiments with reference to the FIGS. 14 to 17.

Figure 14:
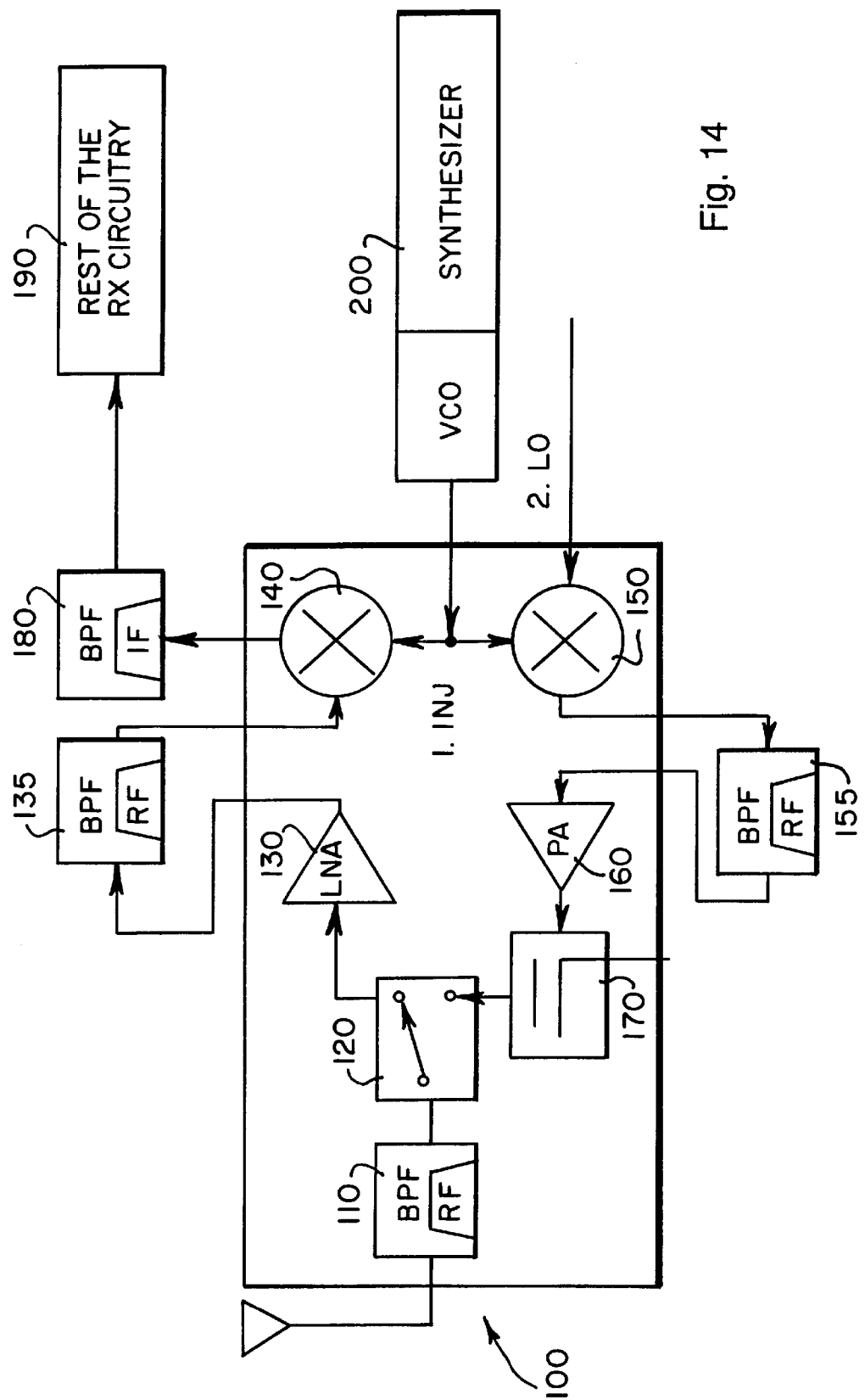
FIG. 14 shows as a block diagram a TDM radio, which uses the transceiver according to the invention.

FIG. 14 shows as a block diagram a TDM radio, whose transmitter receiver has a combination according to the invention comprising the antenna switch, the filter, the receiver's LNA and mixer, and the transmitter's PA, directional coupler and mixer. The integrated structure is marked as 100, and it functions as follows: The filter 110 and the antenna switch 120 form a combined structure which is similar to that described in FIGS. 4b to 13 and controlled by a control logic (not shown). When a signal is received this structure forms a low impedance and low loss signal path from the antenna to the low noise amplifier (LNA) 130, which amplifies the received radio signal. The amplified signal is filtered by the band-pass filter 135, and in the mixer 140 the filtered signal is mixed with the first injection signal supplied by the synthesizer 200. The intermediate frequency (IF) signal obtained as a mixing result is supplied through the band-pass filter (BPF) 180 to the receiver's RF circuit for further processing.

The transmitter section of the radio 100 comprises another local oscillator signal (LO), which is generated by the transmitter front-end (not shown) and mixed with the first injection signal in the mixer 150. The output of the mixer 150 is directed through the band-pass filter 155 to the power amplifier 160, whose output is connected through the directional coupler 170 to the antenna switch/filter-block 110, 120. When a signal is transmitted this block operates in the way described above and forms a low impedance and low loss signal path from the TX port to the antenna.

The structure according to the invention and illustrated in FIG. 14 is based on the perception that it is profitable to look at the radio architecture design from the view point of filter design. Then the input and output impedances of the filter and the antenna switch integrated with it can be selected so that they optimally match the impedances of other section of the structure, particularly the impedances of the amplifier. A thorough design can eliminate the separate 50 ohm impedance matching circuits at the input of the LNA 130 and at the output of the PA 160.

Figure 15:
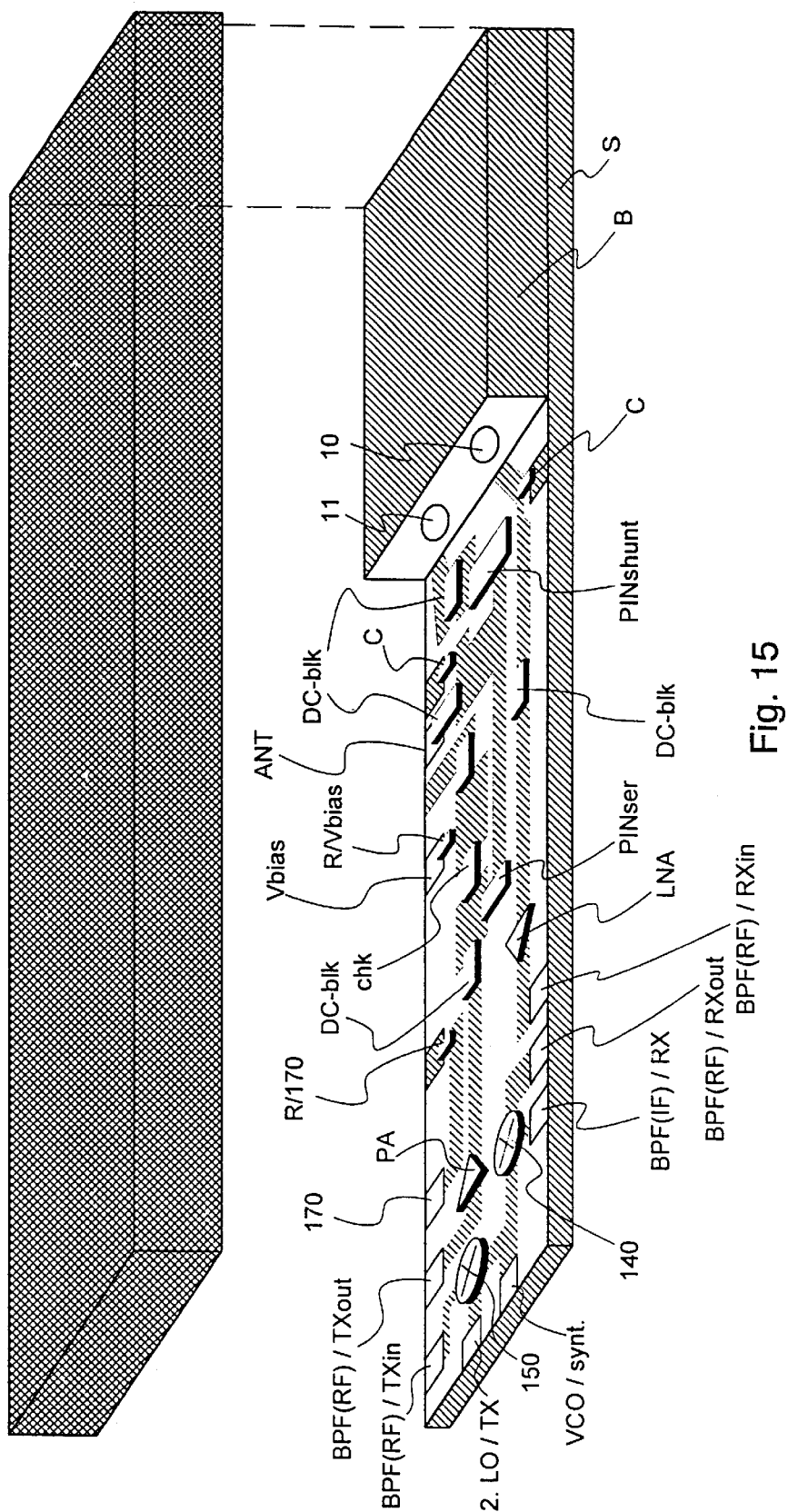
FIG. 15 shows as a circuit diagram and a structural diagram the embodiment of the transceiver according to FIG. 14 by using a dielectric filter.

FIG. 15 shows how the circuit according to the FIG. 14 is realized as an integrated structure according to the invention in a dielectric filter. The FIG. 15 corresponds to the embodiment according to FIG. 9b regarding the passive components of the antenna switch and the filter, so that all components except the resonators are formed by transmission lines (the ruled segments) and discrete components (e.g. surface mount components). The filter comprises a block B of dielectric material, where the resonators are formed as bores, which extend through the block and which are coated with a conducting material. The coupling to the resonators 10, 11 is made on the lateral surface of the resonator block B. Other coupling patterns are arranged on a separate substrate S, which can be a ceramic or a Teflon substrate, or a circuit board of some other material. The discrete components are shown as light segments in the figure. The coupling patterns could be formed and the components be fixed to the lateral surface as well. The active components—LNA, PA and mixers 140 and 150—are shown as discrete components in the embodiment of FIG. 15. They can also be integrated on one GaAs circuit, which comprises the terminals for the band-pass filters, which are marked with the references BPF(RF)/RXin, BPF(RF)/RXout, BPF(RF)/TXin and BPF(RF)/TXout.

The antenna switch which in FIG. 14 is marked with the reference numeral 120 is realized with two PIN diodes PINshunt and PINser in the FIG. 15. Their bias voltage is supplied to the circuit through the port Vbias and the current limiting resistor R/Vbias. The switch functions as shown in FIG. 7, whereby the PINshunt operates as the diode D2 (FIG. 7) and the PINser operates as the diode D1. Other discrete components and the transmission lines connected to them form an impedance matching circuit, which is also used as a phase shifter PS. The figure also shows a metal cover, which encloses the whole circuit and protects it against interference.

Figure 16:
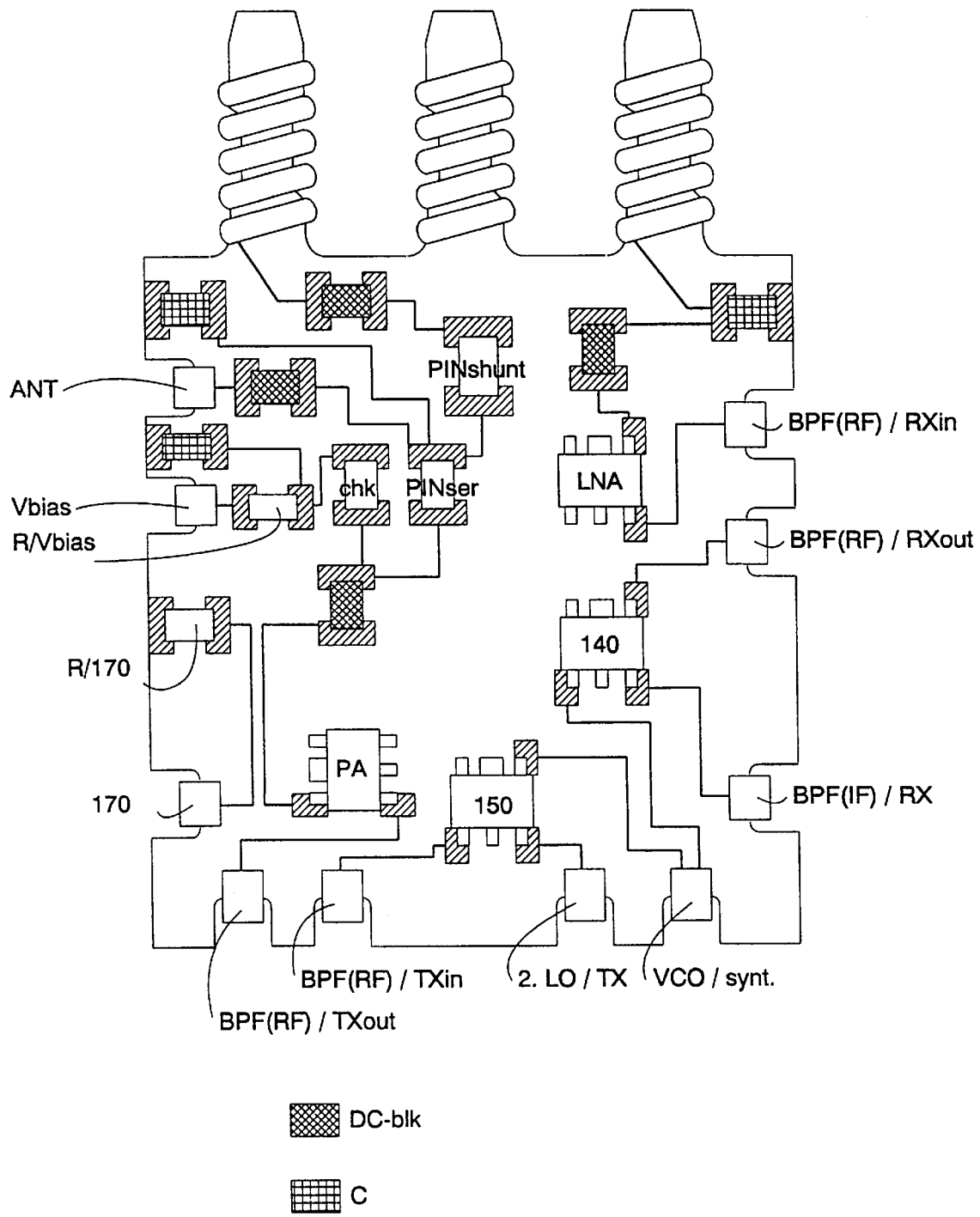
FIG. 16 shows as a circuit diagram and a structural diagram the realization of the transceiver according to FIG. 14 by using a helical resonator filter.

FIG. 16 shows how the circuit according to the FIG. 14 is realized as an integrated structure according to the invention in a helical resonator filter. Regarding the passive components of the antenna switch and the filter the FIG. 16 corresponds to the embodiment of FIG. 15, however so that the resonators are cylindrical coil conductors or helixes wound around the finger-like extensions of the circuit board acting as the supporting structure. The coupling to the helical resonators is made through the connecting tabs on the surface of the circuit board (not shown in the figure). The other coupling patterns are arranged on the circuit board and the discrete components are shown as light or ruled segments in the figure. In a similar way as in FIG. 15 the active components LNA. PA and mixers 140 and 150—are schematically shown as discrete components, but they can also be integrated on one GaAs circuit, which comprises the terminals for the band-pass filters, which are marked with the references BPF(RF)/RFin, BPF(RF)/RXout, BPF(RF)/TXin and BPF(RF)/TXout. The PIN diodes PINshunt and PINser and the circuits connected to them operate in the same way as in the embodiment of FIG. 15.

FIGS. 15 and 16 also show the technical realization of the directional coupler according to the FIG. 6 as a part of the integrated transceiver according to the invention. In FIGS. 15 and 16 the stripline of the directional coupler, which in FIG. 6 is marked as B, is now located adjacent to the stripline directed from the power amplifier PA towards the antenna port. In FIGS. 15 and 16 the directional coupler port 170 and the terminating resistor R/170, which in FIG. 6 are marked as 8 and R, are now located at the edge of the receive and connected to the ends of the stripline of the directional coupler.

Figure 17:
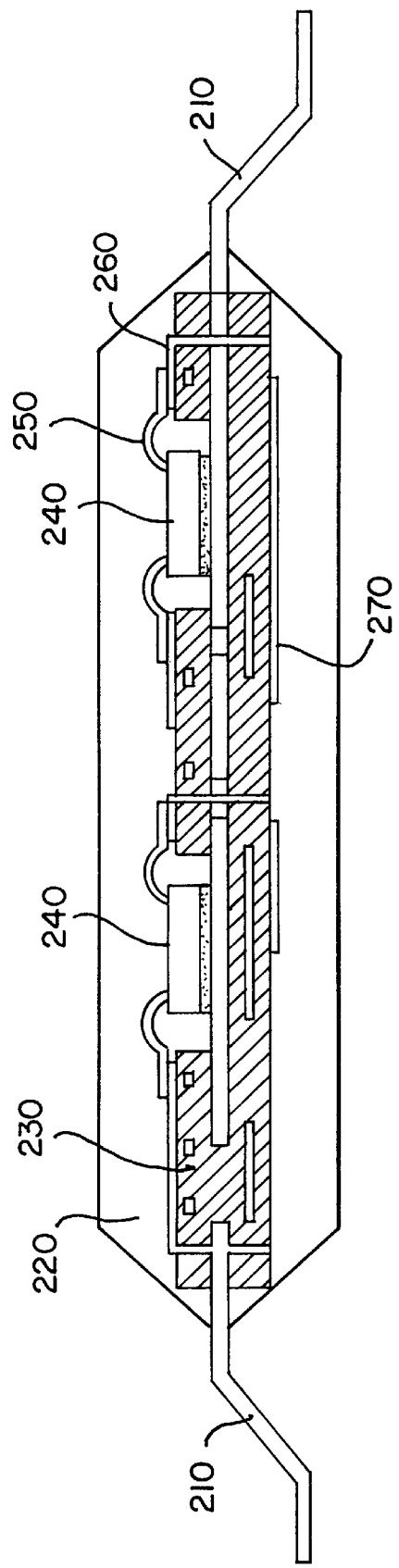
FIG. 17 shows in cross section the embodiment of the transceiver according to FIG. 14 by using ceramic or SAW filters and MCM technology.

FIG. 17 shows how the circuit according to the FIG. 14 is realized as an integrated structure according to the invention, where a ceramic or SAW filter is used as the filter, and where the structure is formed by any known MCM technology, examples of which are MCM-C (Cofired Ceramics)

MCM-L (Organic Laminates)

MCM-D (Deposited Dielectrics)

MCM-D/C (Deposited Dielectric on Cofired Ceramics)

MCM-Si (Inorganic Thick Film), and

Thick film Hybrid MCM.

All passive components connected to the antenna switch and the filter, and the above mentioned active components (LNA, PA, and the mixers) are contained in the multichip module. The active components are mounted in the MCM structure as unpacked chips 240 which are connected by any known method, examples of which are Die Attach/Wire Bonding, Tab, Flip Tab, and Flip Chip methods. In the figures there are the connecting wires 250 according to the Wire Bonding method. The circuit formed by the chips, the components and the transmission lines are molded in a protecting plastic case 220. The ports 210 through which the integrated entity is connected to the antenna, the oscillators and the other sections of the radio, are on the sides of the module (only two ports in the figure).

The embodiment realized with the Multichip-Module method has some advantages compared to embodiments assembled of discrete components. Multi-layer circuit boards 230 can be used in the MCM structure, whereby the conductors 260 between the components and the ground planes belonging to the structure can be placed quite freely within the module. The conductors are shorter, which increases the electrical performance of the circuit and saves area.

When the integrated transceiver according to the invention is used in a radiotelephone of the TDMA/FDD system the good isolation and filtering characteristics of the conventional duplex filter can be retained and at the same time decrease the volume of the transceiver and the area it requires of the circuit board. Further, compared to an RF switch solution, it lowers the number of components to be inserted on the circuit board. The integrated according to the invention can also be used in future dual-mode telephones, in which it may be required that the telephone is prepared to operate with both the TDMA/FDD principle and the TDMA/FDD principle. The use of an arrangement like that of the invention will be particularly important when networks with narrow duplex intervals will come into use. Then it will be impossible to design conventional passive duplex filters within a reasonable volume.

I claim:

1. A radio transceiver comprising a receiver section, a transmitter section, a switching means section, and a filter section, said receiver, transmitter, and switching means sections being collectively formed on at least two physically separable components, all sections being mounted on a single common support structure and connected by conducting paths associated with said support structure to thereby form a discrete structural entity, wherein the impedance characteristics of said connected transceiver sections on said single common support structure are substantially optimally matched, and further wherein:

said receiver section comprises a low noise amplifier, and a first mixer;

said transmitter section comprises a power amplifier, a directional coupler, and a second mixer;

said switching means is connected between said filter and said transmitter and receiver sections to thereby form an antenna switch; and said filter section comprises transmission line resonators and an electrically conducting protective cover, wherein said transmitter section and receiver section are located within said conducting protective cover.

2. A radio transceiver according to claim 1, wherein the filter section comprises a single filter which has a certain pass-band range and which is common to the transmitter section and the receiver section.

3. A radio transceiver according to claim 2, wherein the certain pass-band range of the filter section can be adjusted to a desired range in response to a control signal.

4. A radio transceiver according to claim 1, wherein the filter section comprises a transmitter branch filter and a receiver branch filter, each said filter containing transmission line resonators and having matching circuits to couple the transmission line resonators in each said filter, to couple said filters to said transceiver, and to match the filters to the antenna.

5. A radio transceiver according to claim 1, wherein the resonators are helix resonators.

6. A radio transceiver according to claim 1, wherein the resonators are dielectric resonators.

7. A radio transceiver according to claim 1, wherein the resonators are stripline resonators.

8. A radio transceiver according to claim 1, wherein the filter section comprises a Surface Acoustic Wave filter.

9. A radio transceiver according to claim 1, wherein the receiver section and the transmitter section are realized with physically separable components.

10. A radio transceiver according to claim 1, wherein the receiver section and the transmitter section are realized on one integrated circuit physically separable from said switching means section.

11. A radio transceiver according to claim 1, further comprising input and output nodes located between said low noise amplifier and said first mixer to which a filter may be attached.

12. A radio transceiver according to claim 1, further comprising input and output nodes located between said second mixer and said power amplifier to which a filter may be attached.

13. A radio transceiver comprising a receiver section, a transmitter section, a switching means section, and a filter section all mounted on a common support structure and connected by conducting paths associated with said support structure to thereby form a discrete structural entity, wherein the impedance characteristics of said connected transceiver components on said common support structure are substantially optimally matched, and further wherein:

said receiver section comprises a low noise amplifier, and a first mixer;

said transmitter section comprises a power amplifier, a directional coupler, and a second mixer;

said switching means is connected between said filter and said transmitter and receiver sections to thereby form an antenna switch; and said filter section comprises transmission line resonators and an electrically conducting protective cover, wherein said transmitter section and receiver section are located within said conducting protective cover;

wherein said switching means section and filter section comprise passive components and the receiver section, the transmitter section and at least one of said passive components are realized with a multi-chip module method.

* * * * *